United States Patent [19]

Ooki et al.

[11] Patent Number: 4,854,787

[45] Date of Patent: Aug. 8, 1989

[54] BORING DEVICE

[75] Inventors: Yasumasa Ooki; Osamu Asano; Toshio Mikiya, all of Tokyo, Japan

[73] Assignee: Nitto Kohki Co., Ltd., Tokyo, Japan

[21] Appl. No.: 203,292

[22] Filed: Jun. 2, 1988

Related U.S. Application Data

[62] Division of Ser. No. 082,339, Aug. 6, 1987, Pat. No. 4,770,569.

[30] Foreign Application Priority Data

Sep. 9, 1986 [JP] Japan .................................. 61-210601
Sep. 9, 1986 [JP] Japan .................................. 61-210602
Sep. 9, 1986 [JP] Japan .................................. 61-210605

[51] Int. Cl.⁴ .............................................. B23B 47/34
[52] U.S. Cl. ...................................... 408/17; 74/22 R
[58] Field of Search .......................... 408/17; 74/22 R

[56] References Cited

U.S. PATENT DOCUMENTS

| | | | |
|---|---|---|---|
| 2,412,211 | 12/1946 | Eichelman | 74/22 R |
| 2,458,929 | 1/1949 | Clark | 408/17 |
| 2,514,758 | 7/1950 | Hallden | 74/22 R |
| 2,514,759 | 7/1950 | Hallden | 74/22 R |
| 2,515,539 | 7/1950 | Wickman | 74/22 R |
| 2,521,900 | 9/1950 | Clark | 408/17 |
| 2,869,402 | 1/1959 | Bunnell | 74/22 R |
| 3,003,372 | 10/1961 | Findley | 408/17 |
| 3,028,771 | 4/1962 | Bunnell | 408/17 |

FOREIGN PATENT DOCUMENTS

| | | | |
|---|---|---|---|
| 450106 | 7/1948 | Canada | 408/17 |
| 580700 | 8/1959 | Canada | 408/17 |
| 1423047 | 11/1965 | France | 408/17 |

Primary Examiner—Gil Weidenfeld
Assistant Examiner—Daniel W. Howell
Attorney, Agent, or Firm—Nixon & Vanderhye

[57] ABSTRACT

A boring device has a spindle moving mechanism which retards a tool spindle when the spindle rotates through a predetermined angle. The mechanism has coaxial first and second thrust rings. Thrust balls are disposed between the thrust rings in rolling contact therewith. A retaining element holds the thrust balls such that they keep constant circumferential spaces therebetween. The first thrust ring is fixed to the tool spindle and has recesses in the surface facing the second thrust ring. The second thrust ring is fixed to the casing of the boring device. As the first thrust ring is rotated by the tool spindle, the thrust balls are fitted in the respective recesses, whereby the tool retards by the amount equal to the depth of the recesses. Then, cutting edges of a cutter is separated from the face of a workpiece which is being cut, and a continuous chip is broken into pieces having a predetermined length and is removed from a hole being formed.

2 Claims, 14 Drawing Sheets

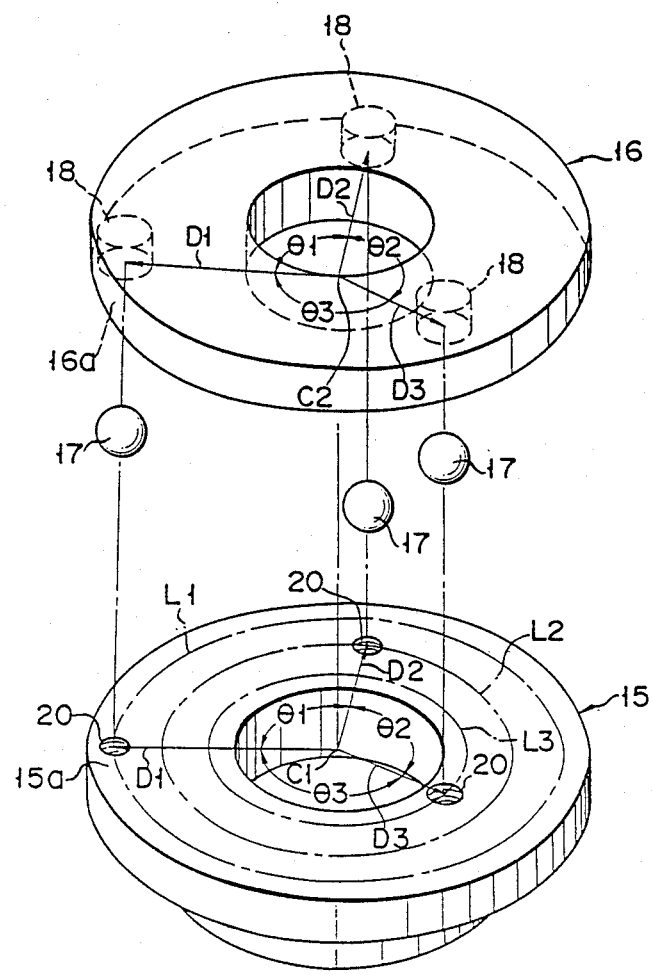
F I G. 3

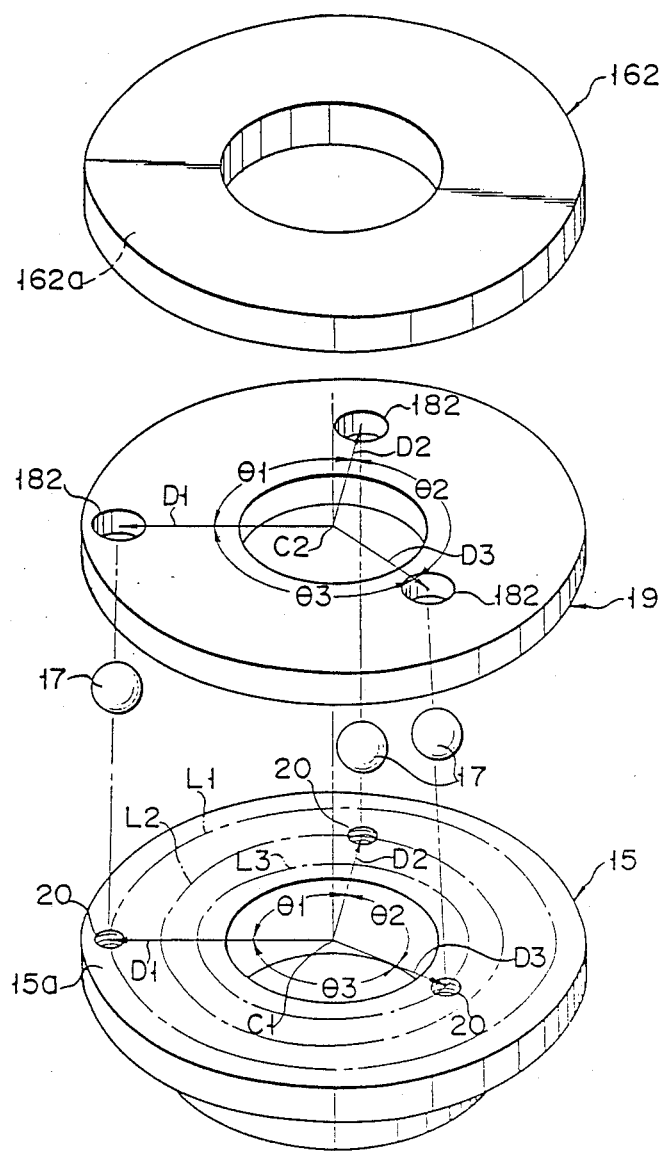
F I G. 8

BORING DEVICE

This is a division of application Ser. No. 082,339, filed Aug. 6, 1987, now U.S. Pat. No. 4,770,569.

BACKGROUND OF THE INVENTION

1. Field of the Invention

This invention relates to a boring device, and more particularly to a drilling machine with an improved efficiency for removing chips formed by a boring tool.

2. Description of Related Art

A boring tool such as an annular cutter or a twist drill which has cutting edges at its tip is formed with flutes in its outer peripheral wall which are continuous with the cutting edges. Chips formed during the boring operation are taken out of the bore hole along the flutes. Chips are broken at such a length as is determined by the material of a work piece, a cutting speed and a feed speed of the tool, and other factors.

When a thrust is applied to the boring tool at a substantially constant feed speed, the chips are relatively long. As the chips are continuously formed, their weight and removal resistance increase, lowering the chip removal efficiency of the tool. Thus, chips are clogged in the spaces between the flutes and a hole being bored. The increased cutting resistance impairs the free cutting performance and reduces the boring efficiency. In addition, cutting edges are undesirably worn out, and friction heat softens the material of the cutting edges.

In order to solve the above problems, there has been proposed a chip breaking member fixed to a drill casing disposed above the cutting tool such that a continuous chip strikes against the breaking member to forcibly break the same due to impact or resistance given by the breaking member.

When such a chip breaking member is disposed adjacent to the boring tool, however, it hinders the boring operation. In addition, the continuous chip may take a halical shape or meander. Thus, it is not assured that the chip will strike against the breaking member. The chps may be continuously removed without being broken.

Further, the usage of a gun drill has been proposed. The gun drill supplies cutting oil under a high pressure through the boring tool to chips being removed so that the cutting oil causes the chips to flow out of the spaces between the flutes and the hole. However, this requires a special tool or a tool head. Therefore, this proposal is not suitable for a boring device such as a portable drill press or a relatively small drilling machine.

U.S. Pat. 2,458,929, U.S. Pat. No. 2,514,758, and U.S. Pat. No. 2,514,759 disclose chip breakers which break chips by periodically lifting spindles. During this lifting operation, however, localized loads are applied to the spindle, thereby making the spindle rotation unstable.

SUMMARY OF THE INVENTION

It is an object of the present invention to provide a boring device for breaking a chip into a piece having a predetermined length and smoothly removing the chip piece from a hole being bored.

In order to achieve the object of the present invention, there is provided a boring device comprising a casing, a tool spindle carried in the casing so as to be axially moved in a feed direction and in a return direction opposite thereto and biased in the return direction. The tool spindle has a lower end portion receiving therein a shank of a boring tool. Between the casing and the tool spindle, a tool spindle moving mechanism is provided which intermittently moves the tool spindle in the return direction, every time the tool spindle rotates around its central axis for a predetermined angle, thereby breaking a chip removed from a working piece into pieces each having a predetermined length. The tool spindle moving mechanism comprises: at least three rolling elements; a first thrust ring disposed coaxial with the tool spindle and having circumferential rolling element running face and rolling element recessed formed complementary to the rolling elements in the rolling element running face, and recesses having a sufficient depth to separate the cutting edges of the boring tool from a cut surface in the hole being cut of the work piece, at least three rolling elements arranged coaxial with the tool spindle, moving on the running face due to the rotation of the tool spindle and simultaneously engaging the respective recesses every time the tool spindle rotates for the predetermined angle; a second thrust ring cooperating with said at least three rolling elements and arranged coaxial with the tool spindle; and a rolling element retaining ring for causing the rolling element to roll on the rolling element running face while a central angle formed by two adjacent rolling elements with respect to the central axis of the tool spindle is kept constant. One of the first and second thrust rings is fixed onto the tool spindle, and the other, fixed onto the casing. The first and second thrust rings, the rolling elements, the rolling element recessess, and the rolling element retaining ring are arranged to move the tool spindle in the return direction when the rolling elements engage the respective rolling element receptacles.

In a boring device according to a preferred embodiment of the present invention, a tool spindle having a lower end receiving the shank of the boring tool therein is axially and reciprocally movable on a casing. A pair of thrust rings are respectively fixed to the tool spindle and the casing so as to cause thrust rings to oppose each other. At least three rolling elements are disposed between the opposed surfaces of the thrust rings, and the rolling elements rolls on the surface of the thrust ring fixed to the tool spindle in predetermined positions of the thrust ring fixed onto the casing. A plurality of recesses are formed in the surface of the thrust ring fixed to the tool spindle and are temporarily and simultaneously engaged with all the rolling elements.

In a boring device according to another embodiment of the present invention, a tool spindle having a lower end portion receiving the shank of a boring tool is axially and reciprocally movable on a casing. A pair of thrust rings opposed axially of the tool spindle are respectively fixed to the tool spindle and the casing. At least three rolling elements contact the opposed surfaces of the thurst rings. A rolling element retaining ring is disposed coaxially with the tool spindle and relatively rotatable therewith. The rolling element retaining ring receives the rolling elements in a predetermined circumferential angular relationship. A plurality of recesses are formed in the surface of the thrust ring fixed to the tool spindle and arranged in the same circumferential angular relationship as that of the retaining ring so as to allow temporary and simultaneous engagement of all the rolling elements with the recesses.

According to the above-mentioned embodiment of the present invention, at least three rolling elements are simultaneously engaged with the recesses in the thrust ring coaxial with the tool spindle during the boring operation, every time the tool spindle rotates through a predetermined angle, thereby displacing the tool spindle in the return direction so as to separate the cutting edge of the boring tool from the cut surface in the hole being cut of the workpiece. Thus, every time the tool spindle is displaced in the return direction, the boring tool ceases to cut the workpiece. The chip can be cut into pieces each having a proper length, e.g., a length corresponding to the circumferential length of the boring tool or a length corresponding to twice the circumferential length. Therefore, the chips can be intermittently removed from the bore being formed. The chips removed from the bore are kept small, to avoid lowering the chip removing efficiency, and chip clogging between the bore and the boring tool does not occur. The chip is not wound around the land of the boring tool. As a result, free cutting property is neither impaired nor is the boring efficiency lowered. Furthermore, it is ensured that the cutting edges are prevented from being excessively worn.

With the above two embodiments, the paired thrust rings are arranged axially. However, these rings can be concentrically arranged.

BRIEF DESCRIPTION OF THE DRAWINGS

This invention can be fully understood from the following description with reference to the accompanying drawings, in which:

FIG. 3 is an exploded perspective view showing a positional relationship between the thrust balls and the first and second thrust rings shown in FIG. 2;

FIG. 8 is an exploded perspective view showing a positional relationship between first and second thrust rings, a ball support ring, and thrust balls shown in FIG. 7;

DETAILED DESCRIPTION OF THE PREFERRED EMBODIMENTS

Figure 1:
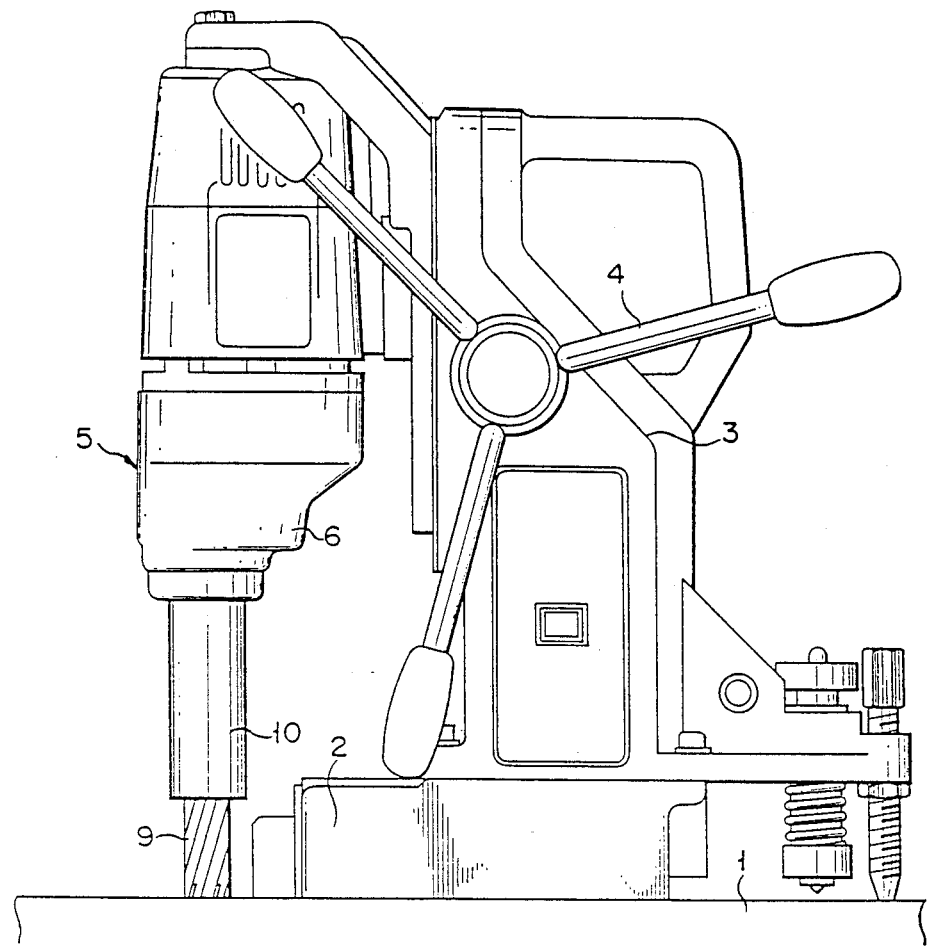
FIG. 1 is a right side elevational view of a drilling machine to which the present invention is applied.

A boring device includes electromagnetic base 2 for electromagnetically attracting workpiece 1 in a desired position thereon. Base 2 is disposed in the lower portion of frame 3. Boring device 5 is supported on the front wall of frame 3 to be reciprocally and vertically moved with respect to workpiece 1 by rotation of handles 4 or an operation of an automatic feed unit (not shown).

Figure 2:
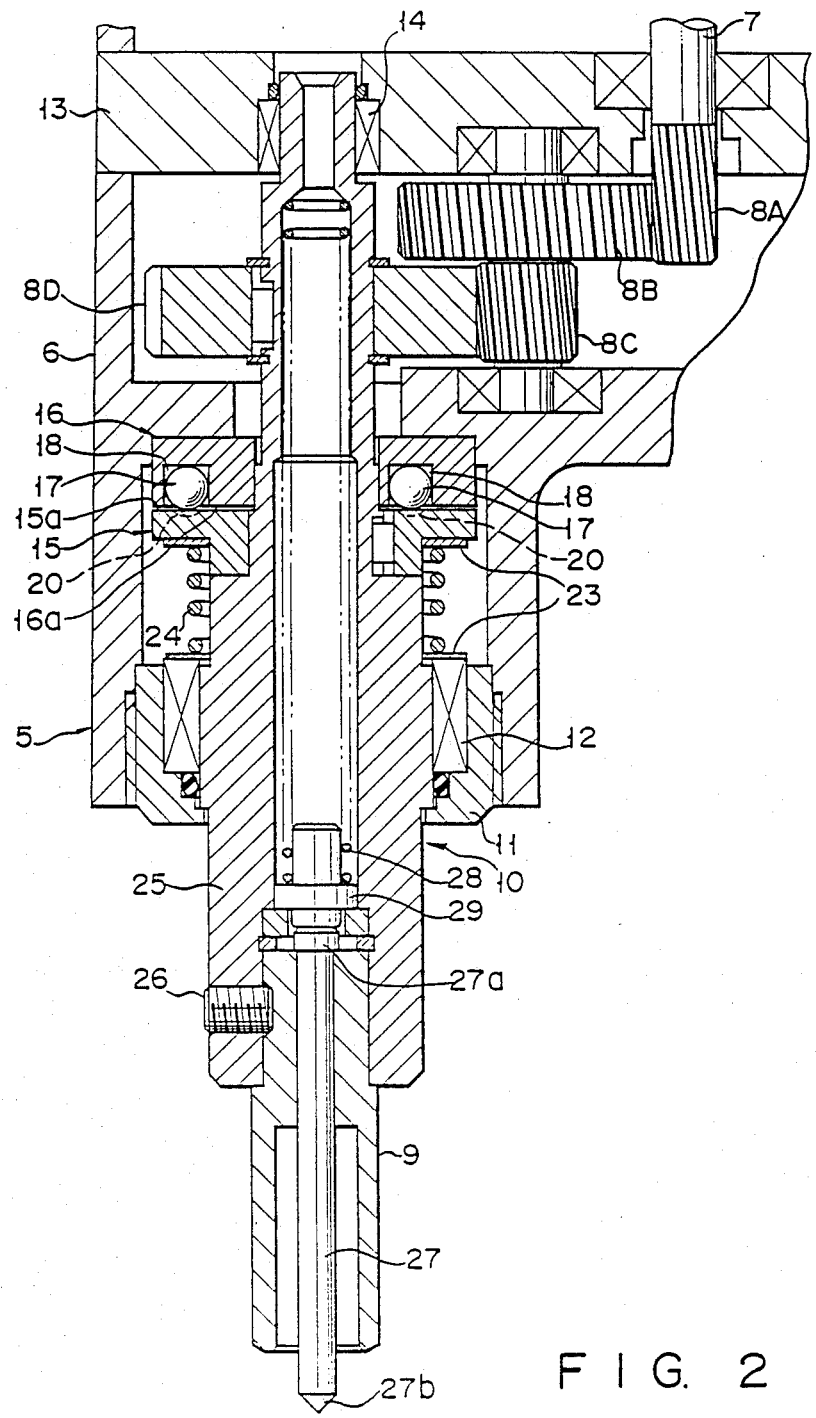
FIG. 2 is a longitudinal sectional view of the main part of a first embodiment of the boring device according to the present invention.
Figure 4:
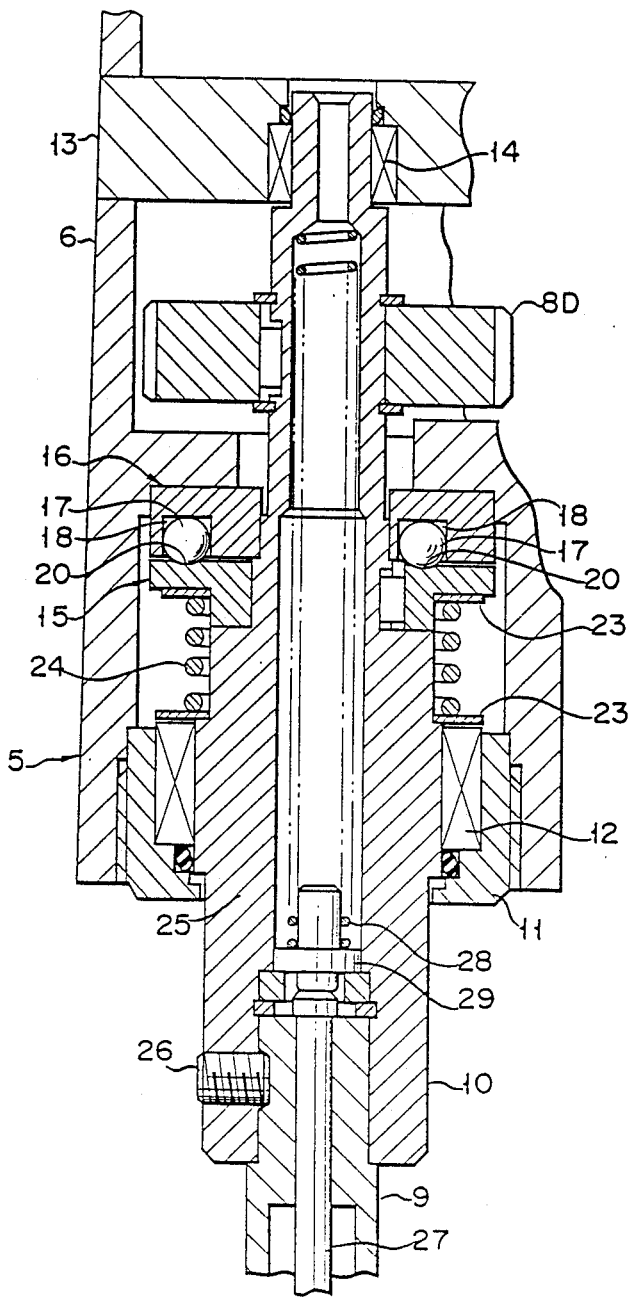
FIG. 4 is a longitudinal sectional view showing a state wherein thrust balls in the boring machine of FIG. 2 are simultaneously and respectively engaged with spherical receptacles of the first thrust ring so that the tool spindle is retracted.

FIGS. 2 to 4 show an embodiment of the present invention.

Casing 6 of boring device 5 houses an electric motor (not shown). Referring to FIG. 2, the rotation of motor shaft 7 reduced by helical gears 8A to 8D is transmitted to tool spindle 10. Boring tool 9 such as an annular cutter and a drill is detachably mounted in the lower end of tool spindle 10.

The lower end of tool spindle 10 projects from housing block 11 threadably engaged with the lower end of casing 6 and fixed thereto. An intermediate portion of tool spindle 10 supported by radial needle bearing 12 fixed to housing block 11. The upper end portion of tool spindle 10 is supported by radial needle bearing 14 in partition plate 13 of casing 6. The portions of spindle 10 which contact and are supported by the bearings 12 and 14 are slightly longer than the thickness of bearings 12 and 14. Therefore, tool spindle 10 can slightly reciprocate in the axial direction thereof.

Flange-like thrust ring or first thrust ring 15 is fixed onto the outer circumferential surface of that portion of spindle 10 which is above radial needle bearing 12 so as to rotate together with spindle 10. Disk-like thrust ring or second thrust ring 16 is located right above first thrust ring 15 so as to face ring 15. The outer circumferential surface of ring 16 is fixed to the inner wall of casing 6. Tool spindle 10 is loosely fitted in the central hole of ring 16.

As shown in FIG. 2, cylindrical ball-receiving bores 18 each having the same depth are formed in lower face 16a of second thrust ring 16. Distances D1, D2, and D3 between center C2 of ring 16 and the central axes of bores 18 differ from each other (D1>D2>D3). Three thrust balls 17 which are an example of rolling elements are fitted in the respective bores 18 such that balls 17 are in rolling contact with the upper face (the rolling element running surface) of first thrust ring 15.

Three spherical recesses 20 having the same depth are formed in the regions of those tracks L1, L2, and L3 on the upper end face or rolling element running surface of ring 15 on which balls 17 roll. Recesses 20 have the same angular relationship with respect to center C1 of ring 15 as that of central angles $\theta 1$, $\theta 2$, and $\theta 3$ defined by the centers of the adjacent bores 18 and center C2 of ring 16, i.e., the central axis of tool spindle 10. Three thrust balls 17 rolling on first thrust ring 15 temporarily and simultaneously fall in the respective recesses 20, every time first thrust ring 15 rotates together with tool spindle 10.

As shown in FIG. 2, a coil compression spring 24 arranged between bearing 12 and first thrust ring 15 urges ring 15 upwardly via upper spacer 23 such that ring 15, together with tool spindle 10, is separated from workpiece 1. The upper end face of first thrust ring 15 is elastically urged against thrust balls 17. Accordingly, spindle 10 is supported by ring 15 and biased in the thrust direction.

As shown in FIG. 3, first thrust ring 15 is supported at three points and elastically urged against three thrust balls 17 rolling on different tracks L1, L2, and L3 so as to prevent excessive wear caused by the rolling of all thrust balls 17 on a single track. When thrust balls 17 roll on the different tracks localized loads would tend to be applied to thrust ring 15. In order to avoid this, distances D1, D2, and D3 and central angles $\theta1$, $\theta2$, and $\theta3$ are adjusted so that the total load is applied to the central axis of tool spindle 10, i.e., on centers C1 and C2 of first and second thrust rings 15 and 16. With the above countermeasure, tool spindle 10 can be stably supported in the thrust direction without applying an inclination force to thrust rings 15 and 16 and without causing eccentric rotation of thrust balls 17, regardless of the spindle speed. Localized wear of individual thrust balls 17 and rolling element running surfaces can also be prevented.

When three thrust balls 17 elastically supporting first thrust ring 15 are simultaneously fitted in the respective recesses 20, ring 15 and spindle 10 fixed thereto are retracted by a distance corresponding to the depth of each recess 20. That is, ring 15 and spindle 10 are displaced upward in FIG. 2. The depth of each of recesses 20 is equal to substantially a maximum allowable thickness of chips formed by boring tool 9. The maximum allowable thickness of chips is determined by the maximum speed of spindle 10 and a maximum allowable feed speed of boring machine 5, both of which are defined as a maximum boring capacity of the boring device, as well as the material of workpiece 1. When thrust balls 17 are fitted in the respective recesses 20 during the boring operation, the cutting edges of boring tool 9 are separated from work piece 1 and temporarily cease to remove the chip therefrom. Therefore, the chip is broken at a length determined by substantially one revolution of tool spindle 10.

As shown in FIG. 2, boring tool 9 comprises a annular cutter and is detachably mounted in cutter arbor 25 of tool spindle 10 and fixed thereto by set screw 26. Pilot pin 27 is inserted in boring tool 9 in alignment with its axis so as to extend from and retract into the lower end of tool 9. When boring tool 9 is attached to tool spindle 10, head 27a of pilot pin 27 is urged downward by press piece 29 which receives a biasing force of compression coil spring 28 in cutter arbor 25 of spindle 10. Tip 27b of pilot pin 27 extends from the lower end of tool 9 and acts as the center thereof. During the boring operation, pin 27 runs idle with its tip 27b contacted with the surface of the workpiece 1. When boring device 5 is moved upward to the return position upon completion of the boring operation, pilot pin 27 pushes out chips from boring tool 9 by the biasing force of compression coil spring 28.

The operation of the first embodiment will be described below.

First thrust ring 15 elastically urges upward three thrust balls 17 in second thrust ring 16, and supports tool spindle 10 fixed to ring 15 in the thrust direction. When spindle 10 is rotated, three thrust balls 17 partially projecting from the bores 18 roll on the different tracks L1, L2 and L3 on ring 15, keeping their angular relationship. Balls 17 are fitted in the respective recesses 20 in the regions of tracks L1, L2, and L3, everytime spindle 10 rotates together with ring 15 by one revolution. Spindle 10 and ring 15, which are biased by spring 24 in a direction opposite to the upper end of spindle 10, (i.e., upward), are axially moved upward by a distance corresponding to the depth of each recess 20 in FIG. 2. This state is shown in FIG. 4. During the boring operation, handles 4 or an automatic feeding unit (not shown) feeds boring tool 9 through tool spindle 10. Upon simultaneous engagement of thrust balls 1 with recesses 20, however, spindle 10 is moved upward by the distance equal to the depth of each recess 20. This exhibits the same effect that the feeding of boring tool 9 is stopped. Since spindle 1 is axially displaced by the same amount as substantially the maximum allowable thickness of the chip, tool 9 temporarily stops cutting workpiece 1. Then, the chip is broken into pieces each having a length corresponding to one revolution of spindle 10, and the broken chip pieces are intermittently removed from a bore being formed.

In the above embodiment, the spindle 10 is retracted every time drill spindle 10 rotates once. When an annular cutter with a relatively large cutting diameter is used, however, two sets of three-recesses 20 are formed in first thrust ring 15. In the region of each track L1, L2, L3, two recesses 20 are formed diametrically opposed to each other. Since each set of recesses 20 simultaneously receives three thrust balls 17, spindle 10 is displaced in a direction opposite to the upper end portion thereof twice (i.e., upwardly), every time spindle 10 rotates once.

Figure 5:
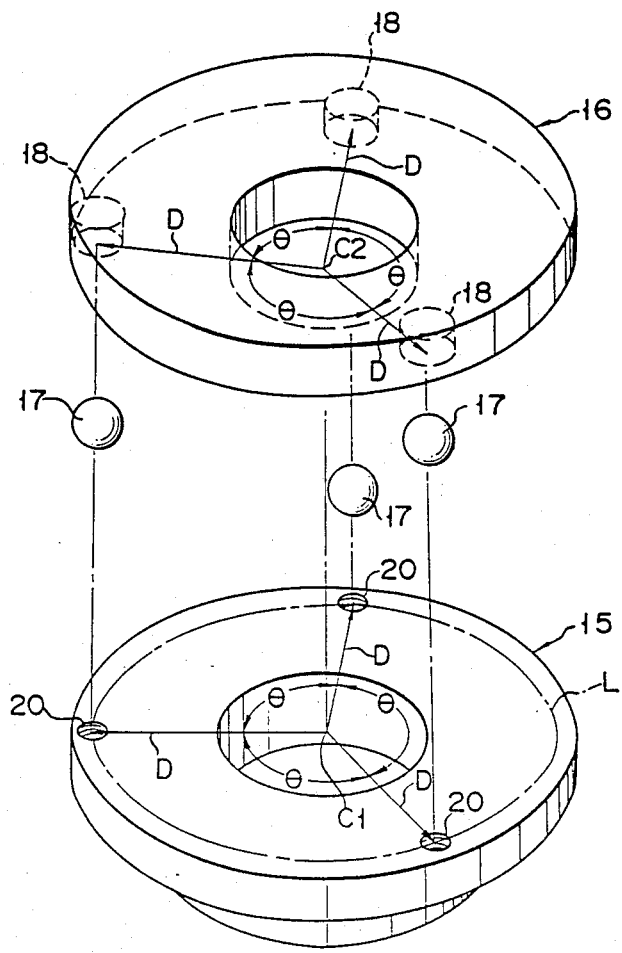
FIG. 5 is an exploded perspective view of a modification of the embodiment of FIG. 2, wherein all thrust balls roll on a single track on the rolling element running face of the first thrust ring.

FIG. 5 is a modification of the first embodiment. If first thrust ring 15 is not exerted by a heavy thrust, three thrust balls 17 are allowed to roll on a common track L. In the region of track L, three recesses 20 are formed to simultaneously receive balls 17. Drill spindle 10 is axially retracted three times for every revolution thereof. In this case, $D1=D2=D3=D$, and $\theta1=\theta2=\theta3=\theta$.

The number of thrust balls 17, the number of tracks, and the number of recesses 20 are appropriately selected to make the number of retraction of spindle 10 per one revolution thereof be 1 or more.

In the above embodiment, opposed end surfaces of first and second thrust rings are perpendicular to the axis of tool spindle 10.

Figure 6:
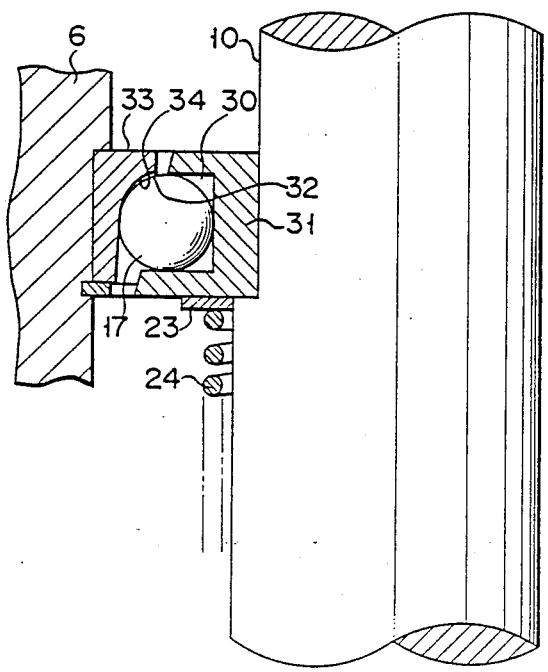
FIG. 6 is a longitudinal sectional view of the main part of a second embodiment of the boring device according to the present invention.

In a second embodiment of the present invention as shown in FIG. 6, first and second thrust rings 33, 31 are arranged concentrically with tool spindle 10. Second thrust ring 31 is fixed onto the outer periphery of spindle 10 and has ball-receiving bores 30 opening at the outer periphery thereof. Preferably, bores 30 are formed equidistantly in the circumferential direction in second thrust ring 31. First thrust ring 33 is fixed to the inner wall of casing 6 and is formed on its inner wall with arcuated track groove 32. The same number of thrust balls 17 (only one shown) as bores 30 partially project from bores 30 and are in rolling contact with groove 32. The same number of spherical recesses 34 (only one shown) as balls 17 are formed complementarily to balls 17 in the upper edge of groove 32 in the same angular arrangement as bores 30. Recesses 34 face inwardly and downward to receive balls 17 biased upward by compression coil spring 24. The depth of each recess 34 is equal to the displacement of tool spindle 10 which is equal to the maximum cutting depth.

Figure 7:
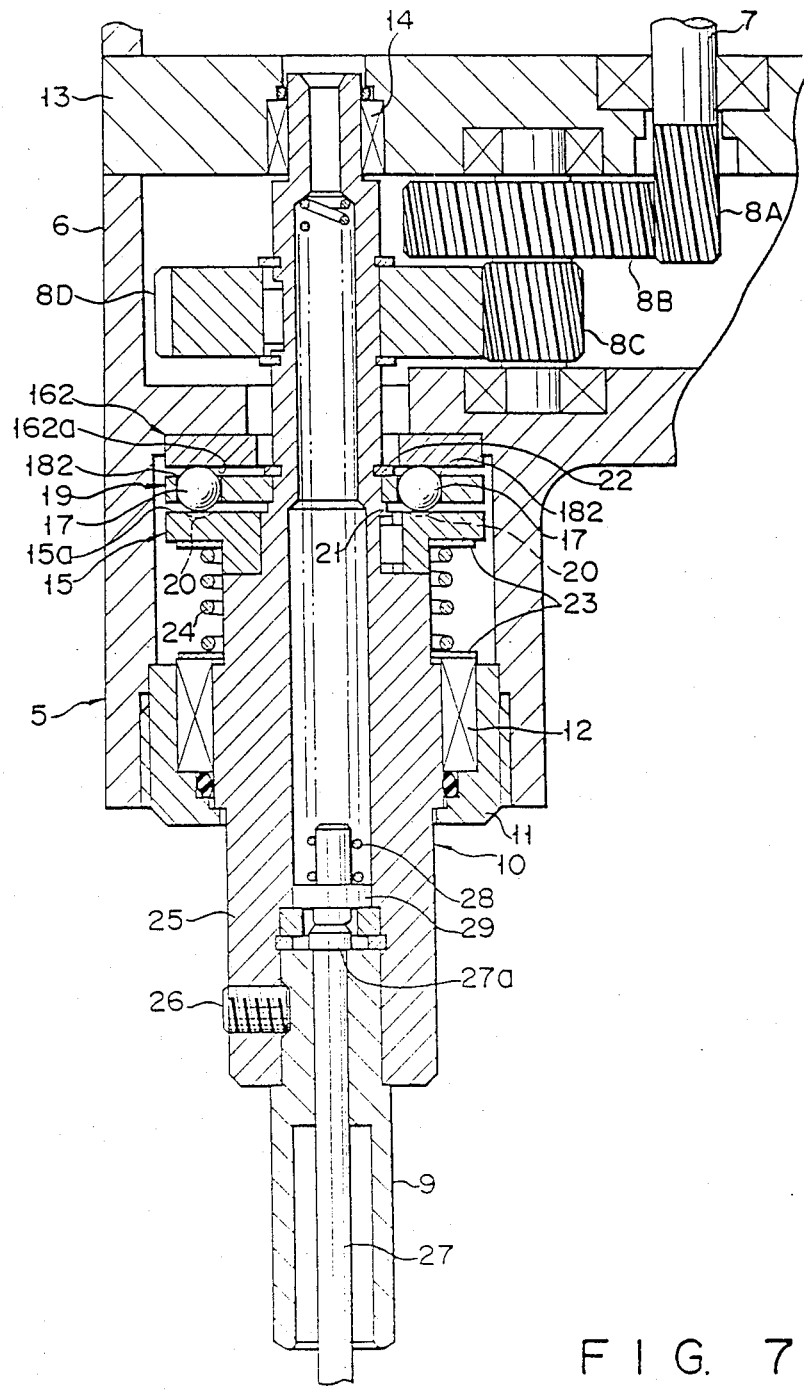
FIG. 7 is a longitudinal sectional view of the main part of a third embodiment of the boring device according to the present invention.
Figure 9:
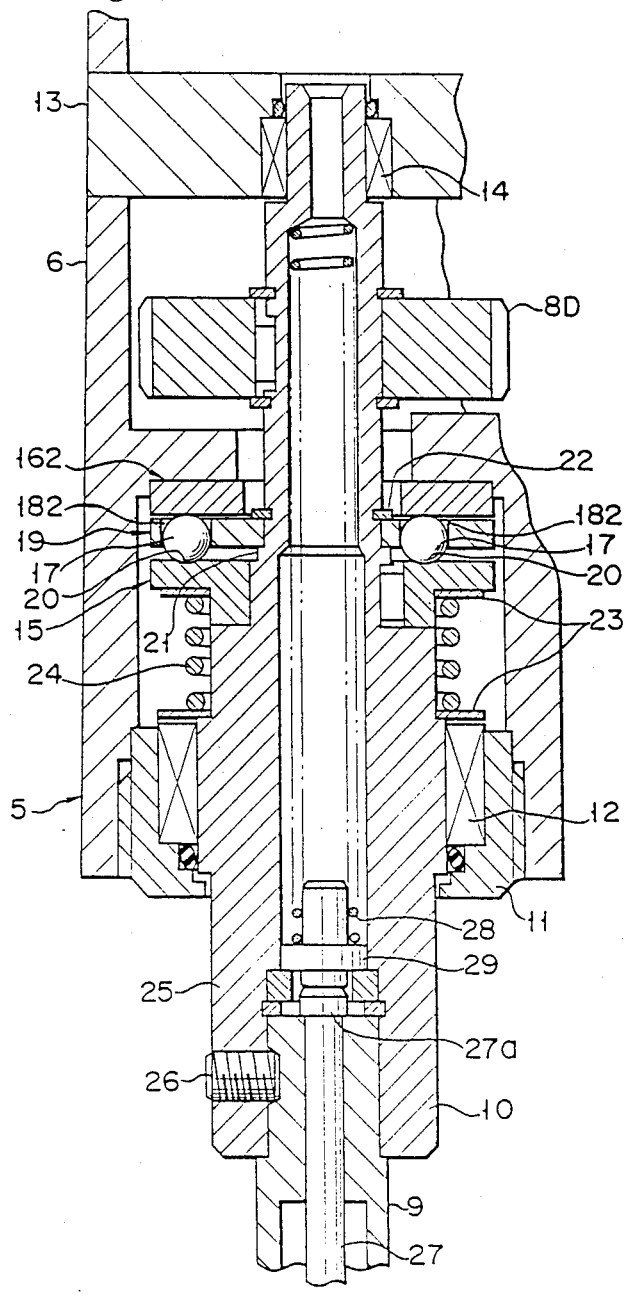
FIG. 9 is a longitudinal sectional view showing a state wherein the thrust balls in the boring device of FIG. 7 are simultaneously and respectively engaged with spherical receptacles so that the tool spindle is retracted.

FIGS. 7 to 9 show a third embodiment of the present invention. For simplicity, the same reference numerals as in the first embodiment denote the same parts in the third embodiment, and the detailed description thereof will be omitted.

Referring to FIG. 7, second thrust ring 162 having a disk-like shape is located above first thrust ring 15 having a flange-like shape. Tool spindle 10 is loosely fitted in the central holes of rings 162 and 15 and fixed to the inner wall of casing 6.

Ball-retaining ring or rolling element-retaining ring 19 has cylindrical ball bores 182 holding thrust balls 17 in a predetermined angular relationship. Between thrust rings 15 and 162, ring 19 is loosely mounted on the outer periphery of spindle 10. Ring 19 is sandwiched between stepped portion 21 of spindle 10 and stop ring 22 fixed to spindle 10, thereby preventing axial movement of spindle 10.

As shown in FIG. 8, three ball-receiving bores 182 are positioned at different distances D1, D2, and D3 (D1>D2>D3) from center C on the axis of spindle 10 so as to provide different tracks L1, L2, L3 for thrust balls 17. Through bores 182 are formed in retaining ring 19 so as to extend central angles $\theta1$, $\theta2$, and $\theta3$ with respect to center C2 of ring 19. Upper and lower portions of thrust balls 17 fitted in bores 182 partially project from the upper and lower surfaces of ball retaining ring 19 and are in rolling contact with the opposed surfaces of thrust rings 15 and 162. When spindle 10 is rotated together with ring 15, balls 17 are rolled on track L1, L2 and L3 and rotates together with ring 19 about the axis of ring 19.

The structure of first thrust ring 15 is the same as that in the first embodiment. Spherical recesses 20 having the same depth are formed to receive respective thrust balls 17 which are fitted in bores 182.

When first thrust ring 15 is rotated together with tool spindle 10, three thrust balls 17 roll on lower end surface 162a of ring 162 and upper end surface 15a of ring 15. Ball retaining ring 19 is rotated accordingly. The distance by which balls 17 roll on upper surface 15a of ring 15 is equal to that by which balls 17 roll on lower surface 162a of ring 162. When ring 15 is rotated, therefore, balls 17 are rolled on lower surface 162a of stationary ring 162 through half the angle through which balls 17 move on tracks L1, L2 and L3 on ring 15. Thus, thrust balls 17 temporarily and respectively engage respective recesses 20 twice, every time ring 15 rotates together with spindle 10.

D1, D2, D3 and $\theta1$, $\theta2$, $\theta3$ are selected so that the total load is applied on the center of thrust ring 15 as explained in the first embodiment.

When three thrust balls 17 are simultaneously fitted in respective recesses 20 of ring 15 during the boring operation, spindle 10 is moved upward by a distance equal to the depth of each recess 20, i.e., corresponding to the substantially maximum allowable thickness of a chip. Unlike in the first embodiment, however, the chip has a length corresponding to substantially two revolutions of spindle 10.

The operation of the third embodiment will be described below.

First thrust ring 15 elastically urges upward (i.e., toward second thrust ring 162) three thrust balls 17 supported by ball retaining ring 19, and spindle 10 fixed to ring 15 is also urged upward, i.e., in the thrust direction. When tool spindle 10 is rotated, balls 17 retained in ring 19 roll on the opposed surfaces 162a and 15a of ring 162 and ring 15. Since ring 162 is fixed to casing 6 and ring 15 rotates together with spindle 10, balls 17 rotate once on tracks L1, L2 and L3 together with ring 19, every time spindle 10 rotates twice. As a result, three thrust balls 17 are simultaneously fitted in respective recesses 20 formed in the regions of tracks L1, L2, and L3 once per one revolution of each ball 17. Spindle 10 and ring 15 are axially moved upward (FIG. 7) by a distance equal to the depth of each recess 20 by compression coil spring 24. Therefore, tool spindle 10 moves from the state of FIG. 7 to the state of FIG. 9. During the boring operation, handles 4 or an automatic feeding unit (not shown) feeds boring tool 9 through tool spindle 10. Upon simultaneous engagement of thrust balls 17 with recesses 20, spindle 10 is moved upward by the distance equal to the depth of each recess 20. This exhibits the same effect that the feeding of boring tool 9 is stopped. Since the axial displacement of spindle 10 is the same as substantially the maximum allowable thickness of the chip, cutting by tool 9 temporarily stops cutting workpiece 1. Then, the chip is broken into pieces each having a length corresponding to substantially two revolutions of spindle 10, and the broken chip pieces are intermittently removed from a bore being formed.

In the third embodiment, spindle 10 is retracted once every time drill spindle 10 rotates twice. For an annular cutter with a relatively large cutting diameter, however, two sets of three recesses 20 are formed in first thrust ring 15. In the regions of each track L1, L2 and L3, two recesses 20 are formed diametrically opposed to each other. Since each set of recesses 20 simultaneously receives three thrust balls 17, spindle 10 is displaced in a direction opposite to its upper end when spindle 10 rotates once.

Figure 10:
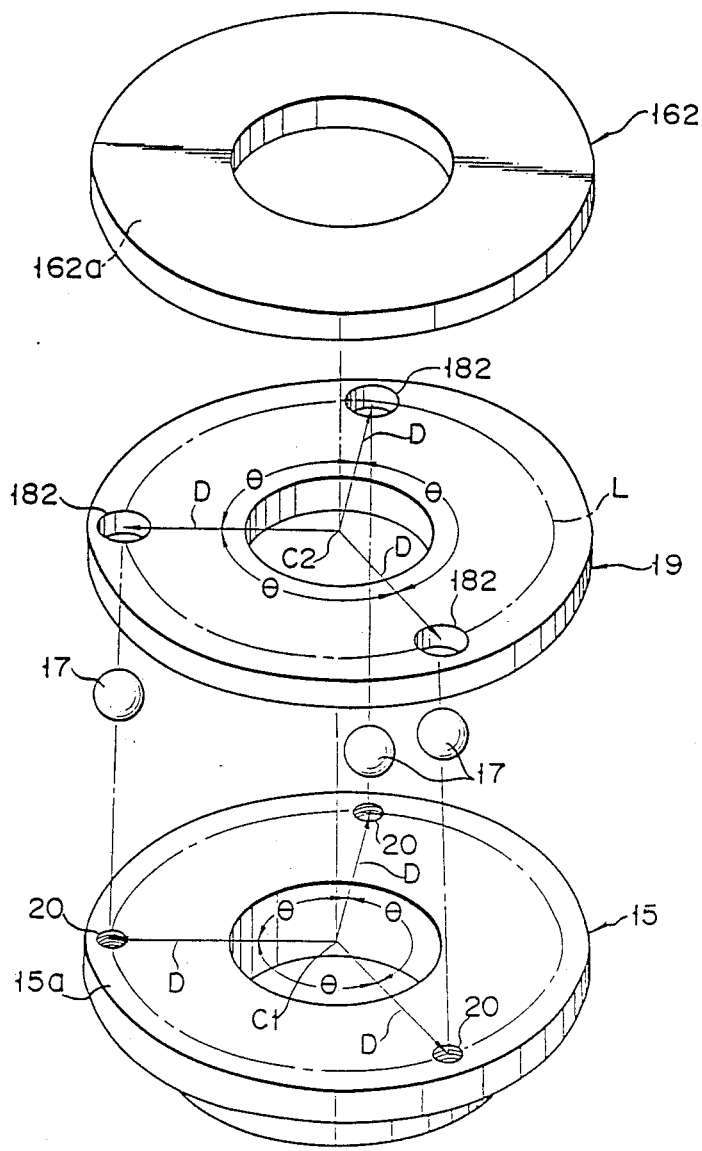
FIG. 10 is an exploded perspective view of a modification of the embodiment of FIG. 7, wherein all the thrust balls are in rolling contact with a single track on the first thrust ring.

FIG. 10 is a modification of the third embodiment, and is used when first thrust ring 15 is not subjected to a heavy thrust. Three thrust balls 17 roll on a common track L. In the region of track L, three recesses 20 are formed to simultaneously receive balls 17. Drill spindle 10 is axially retracted three times for every revolution thereof. Conditions for D and $\theta$ are the same as those in FIG. 5.

The number of thrust balls 17, the number of raceway tracks L, and the number of recesses 20 are appropriately selected to change the number of retraction of spindle 10 per one revolution thereof.

Axial movement of ball retaining ring 19 of the third embodiment along spindle 10 is minimized by stepped portion 21 and stop ring 22 to reduce vibrations and noise. However, ball retaining ring 19 may be rotatably mounted on tool spindle 10.

Figure 11:
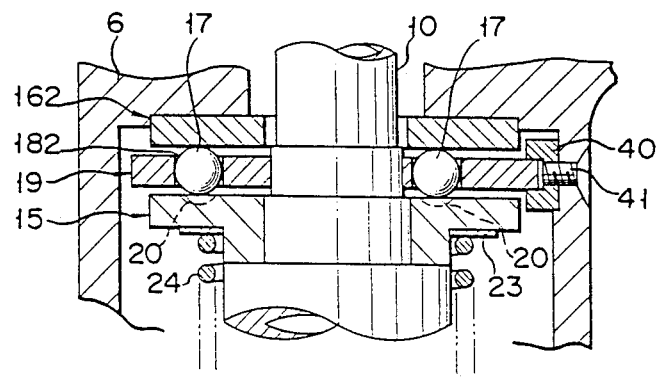
FIG. 11 is a longitudinal sectional view of the main part of a fourth embodiment of the boring machine according to the present invention.

In order to prevent the play of ball retaining ring 19, U-shaped guide tip 40 for supporting the outer periphery of ring 19 may be fixed by screw 41 on the inner surface of casing 6, as shown in FIG. 11. The U-shaped guide tip 40 will therefore prevent play from occurring as the ring 19 rotates due to the outer periphery of ring 19 being supported by the guide tip 40. When guide tip 40 is made of a material having a small friction coefficient, such as nylon or fluoroplastic, the frictional resistance of ring 19 against guide tip 40 can be reduced, thereby reducing the sliding of thrust balls 17.

Figure 12:
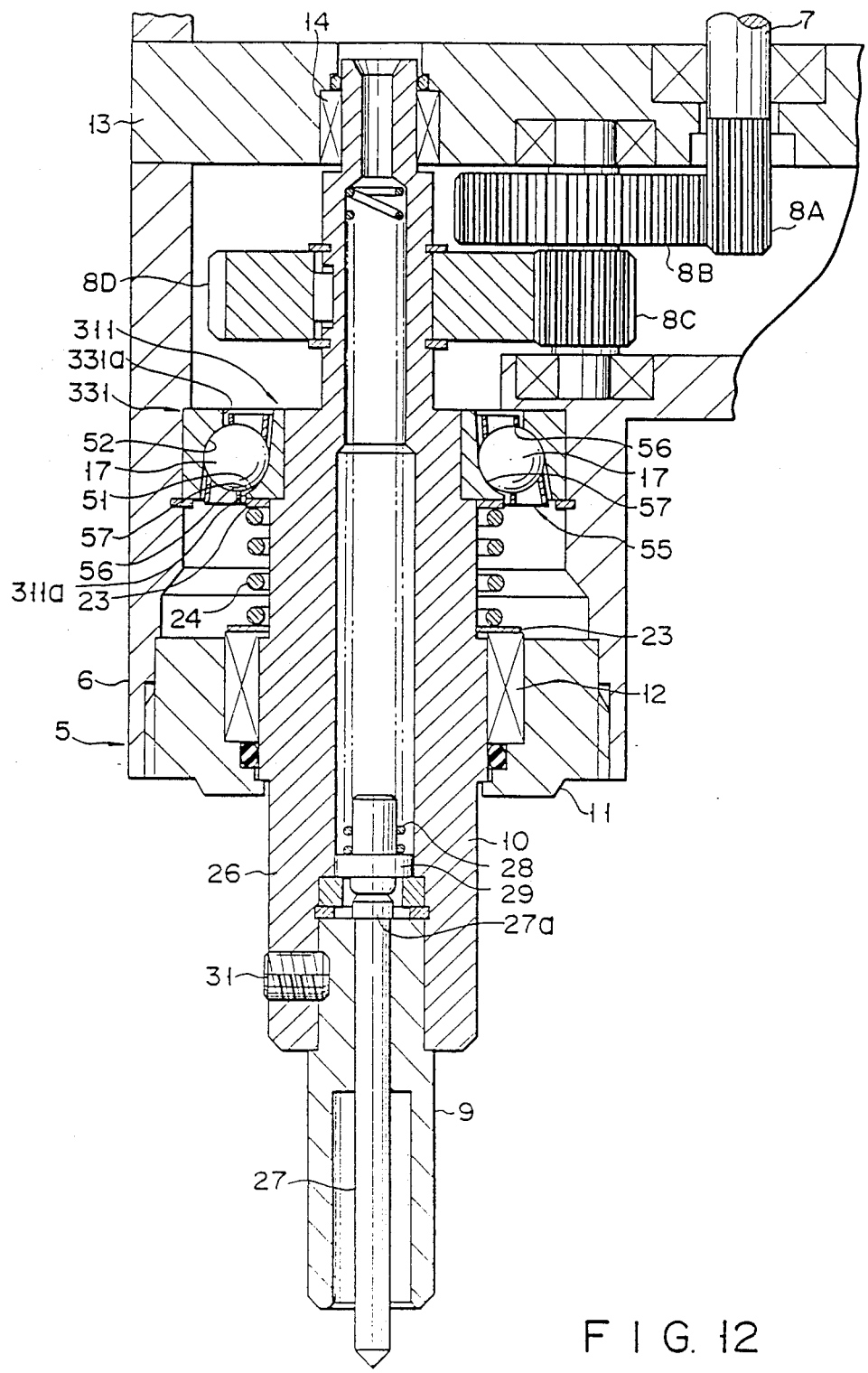
FIG. 12 is a longitudinal sectional view of the main part of a boring device according to a fifth embodiment of the present invention, showing a state wherein thrust balls roll on a single track on the rolling element running face of the first thrust ring.
Figure 13:
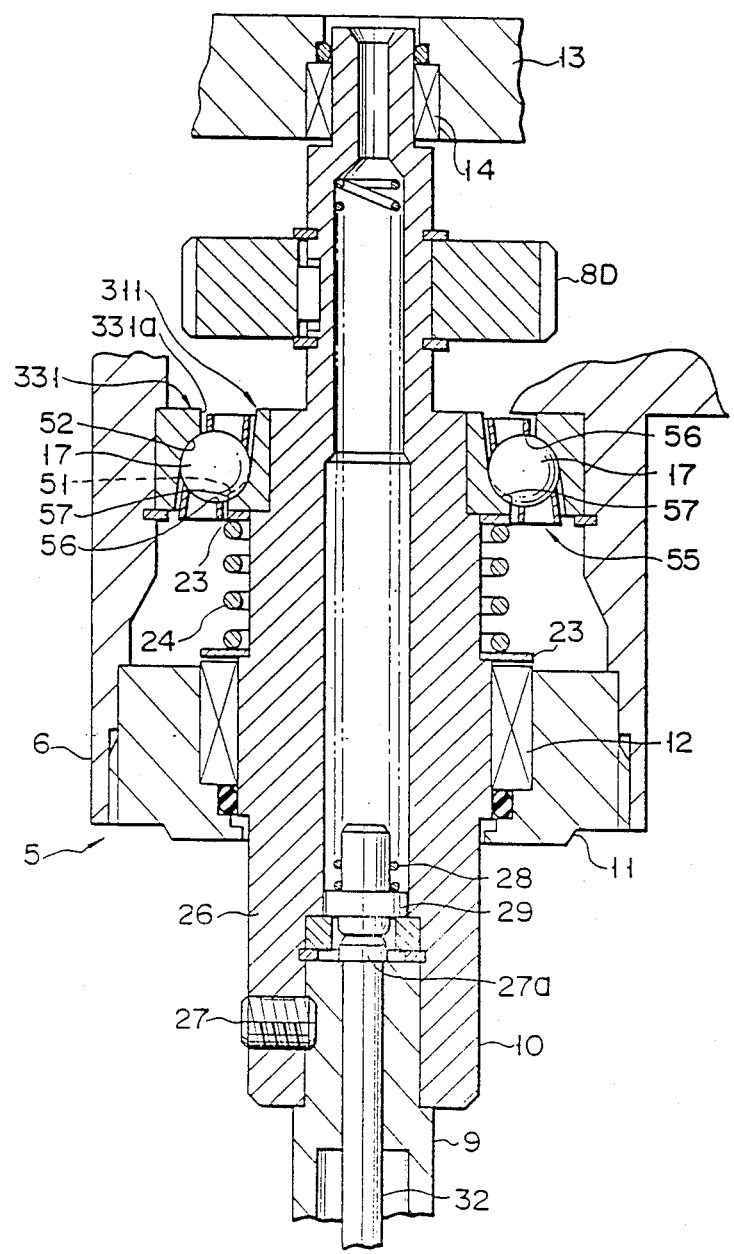
FIG. 13 is a longitudinal sectional view of the embodiment of FIG. 12, showing a state wherein the thrust balls are respectively fitted in the receptacles.
Figure 14:
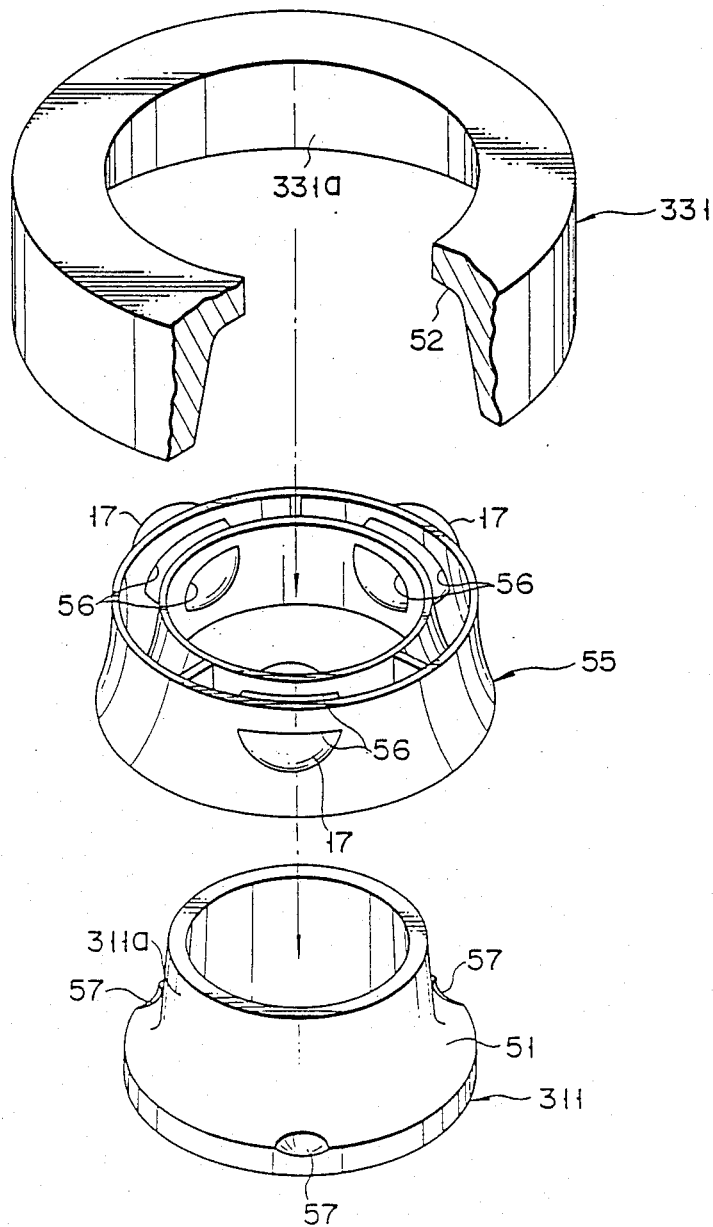
FIG. 14 is an exploded perspective view showing the positional relationship between the first and second thrust rings, the ball support ring, and the thrust balls in the embodiment of FIGS. 12 and 13.

FIGS. 12 to 14 show a fifth embodiment of the present invention. The same reference numerals as in the previous embodiments denote the same parts in the fifth embodiment, and a detailed description thereof will be omitted.

First thrust ring 311 is fixed to the portion of tool spindle 10 above radial needle bearing 12 and rotatable with tool spindle 10. Track surface 51 having the same radius of curvature of thrust ball 17 and facing downward is formed on outer wall 311a to receive an upward thrust load from balls 17. Second thrust ring 31 is fixed onto the inner wall of casing 6 concentrically with ring 311 such that the inner wall of second thrust ring 331 faces track surface 51 formed on the outer periphery of ring 311 with a predetermined space therebetween. Track surface 52 having the same radius of curvature as that of thrust ball 17 and facing downward is formed on inner wall 331a of second thrust ring 331 to receive a thurst load from balls 17.

Ball or rolling element retaining ring 55 made of a metal plate has three ball-receiving bores 56 for receiving respective thrust balls 17 as rolling elements in rolling contact with tracks 51 and 52 and defines a predetermined angular relation of balls 17 with respect to the center of ring 55. Retaining ring 55 is disposed between first and second thrust rings 311, 331 such that thrust balls 17 are partially exposed from the inner and outer circumferential surfaces of ring 55. Rolling element or ball receiving bores 56 are spaced apart from each other at an equal angular interval of 120° with respect to the axis of ring 55.

First thrust ring 311 is elastically urged upwardly i.e., in return direction through spacer 23 by compression coil spring 24 between first thrust ring 311 and lower radial needle bearing 12. First thrust ring 311 also elastically urges thrust balls 17 against second thrust ring 331 and supports tool spindle 10 fixed by first thrust ring 311 to be biased in the thrust direction.

When a thrust load for tool spindle 10 is applied to both thrust rings 311 and 331 through thrust balls 17, balls 17 are rolling contact with track surface 51 and 52.

The angular or rotational displacement of first thrust ring 311 with respect to thrust balls 17 is equal to that of thrust balls 17 with respect to second thrust ring 331. When thrust ring 311 is rotated, therefore, balls 17 revolve through half the rotational angle of first thrust ring 311. In other words, thrust balls 17 supported by retaining ring 55 are rotated at half the rotational speed of first thrust ring 311.

Three spherical recesses 57 having the same depth are formed in track surface 51 of first thrust ring 311 at an equal angular interval, i.e., at an equal central angle of 120° such that they simultaneously engage with and disengage from thrust balls 17. Since the relative angular positions of three recesses 57 have the same relationship as those of thrust balls 17 in ball retaining ring 20, three thrust balls 17 are instantaneously fitted in respective recesses 57 three times, every time tool spindle 10 rotates twice.

Since tool spindle 10 fixed by first thrust ring 311 elastically biased by compression coil spring 26 upward, in the return direction, spindle 10, upon the above engagement, is retracted by a distance equal to the depth of recesses 57 (upward in FIG. 12). The chip is broken into pieces each having a length corresponding to about ⅔ revolution of tool spindle 10.

The operation of the fifth embodiment will be described below.

When tool spindle 10 is rotated, thrust balls 17 roll on track surface 52 of second thrust ring 331 and track surface 51 of first thrust ring 311. Balls 17 are rotated together with ball retaining ring 20 once per two revolutions of tool spindle 10. Balls 17 are simultaneously fitted in recesses 57 formed in the region of track surface 51 three times per its own one revolution.

Tool spindle 10 and first thrust ring 311 which receive an elastic force of compression coil spring 24 directed upward, i.e., in the return direction are moved upward in FIG. 12 by a distance equal to the depth of each recess 57. The spindle 10 moves from the FIG. 12 to the state of FIG. 13. Upon simultaneous engagement of thrust balls 17 with recesses 57, spindle 10 is moved upward by the distance equal to the depth of each recess 57. This exhibits the same effect that the feeding of boring tool 9 is stopped. Since spindle 10 is moved axially by the same amount as substantially the maximum allowable thickness of the chip, tool 9 temporarily stops cutting workpiece 1. Then, the chip is broken into pieces having a length corresponding to ⅔ revolution of spindle 10, and the broken chip pieces are intermittently removed from a bore being formed.

In the above embodiments, tool spindle 10 is upwardly moved three times per two revolutions thereof. When an annular cutter having a relatively large diameter is used, however, six recesses 57 may be formed in the region of track surface 51 with an equal central angles of 60° defined between adjacent recesses 51 with respect to the axis of retaining ring 19. Spindle 10 is upwardly moved three times per revolution thereof. By properly combining the number of thrust balls and the number of recesses, a ratio of the number of upward movement of the spindle to the number of its revolution may be arbitrarily set to 3/2 or more.

In the above embodiments, rolling elements disposed between the first and second thrust rings are not limited to thrust balls but can be replaced with conical rolls. Recesses for intermittently receiving the rolling elements can be formed on either or both of the paired thrust rings.

The boring tool mounted in the tool spindle is not limited to the annular cutter but can be replaced with a twist drill.

In the above embodiments, the present invention has been applied to portable drilling machine with an electromagnetic base. However, the present invention is also applicable to a small drilling machine or an electric drill.

What is claimed is:

1. A boring device having a casing, a tool spindle supported in said casing and movable in axial directions thereof, one direction being a feed direction and the other direction being a return direction, said tool spindle having an axis and being biased in said return direction, said tool spindle holding a cutter having cutting edges, and spindle moving means disposed between said casing and said spindle intermittently moving said tool spindle in said return direction every time said tool spindle rotates through a predetermined angle about said axis of said tool spindle for breaking a chip at a predetermined length, said spindle moving means comprising at least three rolling elements, first thrust means disposed coaxially with said tool spindle and having a track surface extending circumferentially of said first thrust means, said track surface having a single track, said rolling elements being arranged to roll on said single track, and recesses being formed complementary to said rolling elements and having such a depth that said cutting edges of said cutter are separated from a surface being cut of a workpiece when said rolling elements are received in said recesses, second thrust means cooperating with said rolling elements, and rolling element retaining means for maintaining equal central angles defined by adjacent ones of said rolling elements with respect to said axis of said tool spindle, one of said first and second thrust means being fixed to said tool spindle, the other one of said first and second thrust means being fixed to said casing, and a guide tip provided between said casing and said rolling element retaining ring for guiding rotation of said rolling element retaining ring.

2. The device according to claim 1, wherein said first thrust means comprises a first thrust ring having a flanged shape, said second thrust means comprises a second thrust ring having a disk shape, and said rolling element retaining means comprises a rolling element retaining ring having two end surfaces, disposed between said first and second thrust rings and formed with through bores receiving said rolling elements, said rolling elements being received in said bores so that said rolling elements project from said end surfaces of said rolling element retaining ring.

* * * * *